(12) United States Patent
Johansson et al.

(10) Patent No.: US 12,515,578 B2
(45) Date of Patent: Jan. 6, 2026

(54) TWISTLOCK ASSEMBLY

(71) Applicant: Volvo Truck Corporation, Gothenburg (SE)

(72) Inventors: Lars Johansson, Sätila (SE); Caroline Lidberg, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 794 days.

(21) Appl. No.: 17/785,206

(22) PCT Filed: Dec. 17, 2020

(86) PCT No.: PCT/EP2020/086630
§ 371 (c)(1),
(2) Date: Jun. 14, 2022

(87) PCT Pub. No.: WO2021/122887
PCT Pub. Date: Jun. 24, 2021

(65) Prior Publication Data
US 2023/0014416 A1    Jan. 19, 2023

(51) Int. Cl.
*B60P 7/13*    (2006.01)
*B62D 63/08*    (2006.01)

(52) U.S. Cl.
CPC .............. *B60P 7/132* (2013.01); *B62D 63/08* (2013.01)

(58) Field of Classification Search
CPC ... B60P 7/132; B61D 45/007; B65D 90/0013; B62D 63/08
USPC .......................................... 410/82; 294/81.53
See application file for complete search history.

(56) References Cited

U.S. PATENT DOCUMENTS

| | | | | |
|---|---|---|---|---|
| 3,545,713 | A | * | 12/1970 | Hamilton .............. B61D 45/007 410/83 |
| 3,614,153 | A | * | 10/1971 | Tantlinger .............. B60P 1/6481 410/82 |
| 4,626,155 | A | | 12/1986 | Hlinsky et al. |
| 6,336,765 | B1 | * | 1/2002 | Watanabe .......... B65D 90/0013 410/82 |

(Continued)

FOREIGN PATENT DOCUMENTS

| | | |
|---|---|---|
| CN | 1764561 A | 4/2006 |
| CN | 101033035 A | 9/2007 |
| CN | 109937183 A | 6/2019 |

(Continued)

OTHER PUBLICATIONS

First Office Action for Chinese Patent Application No. 202080086663.3, mailed Nov. 22, 2023, 12 pages.

(Continued)

*Primary Examiner* — Daniel J Colilla
(74) *Attorney, Agent, or Firm* — Withrow & Terranova, PLLC

(57) ABSTRACT

The present invention relates to a twistlock assembly for securing a cargo member to a cargo receiving arrangement. The twistlock assembly comprises a twistlock and a base member. The twistlock is adapted to be at least partially inserted into an opening of a cargo member. The twistlock is adapted to assume each one of an unlocked position and a locked position, wherein the cargo member is prevented from being disconnected from the base member when the twistlock assumes the locked position.

17 Claims, 7 Drawing Sheets

(56) References Cited

U.S. PATENT DOCUMENTS 7,891,922 B2 *  2/2011  Fukuda ................. B62D 33/10
                                                   410/82
2017/0158110 A1  6/2017  Jo

FOREIGN PATENT DOCUMENTS

DE    19520791 A1    12/1995
EP     1063178 B1     8/2004
JP    H0259189 A      2/1990
KR    200186762 Y1 *  6/2000   ............... B60P 7/13

OTHER PUBLICATIONS

International Search Report and Written Opinion for International Patent Application No. PCT/EP2020/086630, mailed Mar. 24, 2021, 12 pages.

\* cited by examiner

TWISTLOCK ASSEMBLY

This application is a 35 USC 371 national phase filing of International Application No. PCT/EP2020/086630, filed Dec. 17, 2020, which claims the benefit of International Application No. PCT/EP2019/085997, filed Dec. 18, 2019, the disclosures of which are incorporated herein by reference in their entireties.

TECHNICAL FIELD

The invention relates to a twistlock assembly. Moreover, the present invention relates to a cargo receiving arrangement.

The invention can be applied in heavy-duty vehicles, such as trucks, buses and construction equipment. Although the invention will be described with respect to a truck as well as with respect to a trailer, the invention is not restricted to this particular vehicle types, but may also be used in other vehicles such as buses, marine vessels or working machines.

BACKGROUND OF THE INVENTION

When a cargo member is loaded onto a cargo receiving arrangement, for instance when a container is loaded onto a trailer, there may be one or more connection portions of the cargo receiving arrangement which need to be fitted to the cargo member to securely lock the cargo member to the cargo receiving arrangement. For this purpose, the cargo receiving arrangement may comprise one or more twistlocks.

Generally, a twistlock is adapted to assume each one of an unlocked position and a locked position, wherein the cargo member is prevented from being disconnected from the cargo receiving arrangement when the twistlock assumes the locked position, assuming that a portion of the cargo member is correctly placed in relation to the twistlock concerned.

However, there is a risk that the cargo member is incorrectly loaded onto the cargo receiving arrangement such that the above-mentioned portion of the cargo member is incorrectly placed in relation to the twistlock. In such a situation, there is a risk that the twistlock will not lock the cargo member to the cargo receiving arrangement in an appropriate manner.

SUMMARY OF THE INVENTION

An object of the invention is to provide a twistlock assembly that implies an appropriately high probability of connecting a cargo member to a cargo receiving arrangement.

According to a first aspect of the invention, the above object is achieved by a twistlock assembly according to claim 1.

As such, the present invention relates to a twistlock assembly for securing a cargo member to a cargo receiving arrangement. The twistlock assembly comprises a twistlock and a base member. The twistlock is adapted to be at least partially inserted into an opening of a cargo member. The twistlock is adapted to assume each one of an unlocked position and a locked position, wherein the cargo member is prevented from being disconnected from the base member when the twistlock assumes the locked position.

The twistlock assembly further comprises a permittance assembly. The permittance assembly is such that it:

assumes a permittance condition when a load applied by the cargo member to the permittance assembly is greater than or equal to a predetermined threshold load, such that the twistlock can be moved from the unlocked position to the locked position as well as from the locked position to the unlocked position, and assumes a prevention condition when the load applied by the cargo member to the permittance assembly is less than the predetermined threshold load, such that the twistlock is prevented from being moved from the unlocked position to the locked position.

The twistlock assembly according to the present invention is consequently such that the twistlock can e.g. be moved from the unlocked position to the locked position when the permittance assembly is in the permittance condition but not when the permittance assembly is in the prevention condition. As such, if the cargo member is for instance incorrectly placed relative to the twistlock assembly, the cargo member may not be able to apply an appropriately high load on the permittance assembly, as a consequence of which the twistlock cannot be moved from the unlocked position to the locked position.

As such, by virtue of the twistlock assembly according to the present invention, there is a low risk that the twistlock can assume the locked position in situations when the cargo member is incorrectly positioned relative to the twistlock. Consequently, the twistlock assembly in accordance with the present invention implies, with a relatively high level of certainty, that a twistlock that is in the locked position also actually prevents the cargo member from being disconnected from the cargo base member.

Moreover, the permittance assembly comprises a resilient assembly adapted to receive at least a portion of the load applied by the cargo member. The use of a resilient assembly implies a cost efficient implementation for allowing the permittance assembly to assuming either one of the permittance condition and the prevention condition.

Further, an attachment portion of the resilient assembly is fixedly attached to the base member, and a load receiving portion of the resilient assembly is adapted to receive the at least a portion of the load applied by the cargo member.

Additionally, the load receiving portion comprises a first load receiving portion and a second load receiving portion, the first and second load receiving portions are located on opposite sides of the twistlock.

The first and second load receiving portions being located on opposite sides of the twistlock implies that the fact that the cargo member is positioned correctly relative to the twistlock assembly can be established with an appropriately level of certainty. For instance, in the event that a cargo member is inadvertently placed on only one side of the twistlock, the twistlock assembly according to the above may still be prevented from being moved from the unlocked position to the locked position.

Optionally, the twistlock assembly further comprises an actuator connected to the twistlock. The actuator is adapted to assume an unlocked condition resulting in that the twistlock assumes the unlocked position. The actuator is also adapted to assume a locked condition resulting in that the twistlock assumes the locked position.

Optionally, the actuator can assume each one of the locked condition and the unlocked condition when the permittance assembly assumes the permittance condition. As such, it may be possible to move the twistlock, using the actuator, between the unlocked and locked positions when the permittance assembly assumes the permittance condition.

Optionally, the actuator is adapted to be actuated manually.

Optionally, the actuator comprises a lever.

Optionally, the permittance assembly comprises a stop member, adapted to abut at least a portion of the twistlock to thereby prevent the twistlock from assuming the locked position, when the permittance assembly assumes the prevention condition.

Optionally, each one of the first load receiving portion and the second load receiving portion is adapted to abut a portion of the cargo member.

Optionally, the first load receiving portion and the second load receiving portion constitute portions of a single member forming part of, or constituting, the resilient assembly.

The fact that the first and second load receiving portions of a single member form part of, or constitute, the resilient assembly implies a robust twistlock assembly since the resilient assembly can be made relatively large and thus comprise the first and second load receiving portions. Moreover, by virtue of the fact that the first load receiving portion and the second load receiving portion constitute portions of a single member, the permittance assembly may assume the permittance condition only when the cargo member is positioned correctly relative to the twistlock assembly, with an appropriately high level of certainty.

Optionally, the resilient assembly comprises at least one of the following: an elastic spring, a hydraulic spring, an electrically biased spring and a pneumatic spring.

Optionally, the resilient assembly at least partially encloses the twistlock in a circumferential direction around the twistlock. This implies a robust twistlock assembly being less prone to jamming when being subjected to loads, such as the load applied by the cargo member. Moreover, a resilient assembly that at least partially encloses the twistlock may be less sensitive to dirt and the like as compared to e.g. a small elastic member that is only located on one side of the twistlock.

Optionally, the resilient assembly comprises a helical spring at least partially enclosing the twistlock in the circumferential direction around the twistlock.

Optionally, the resilient assembly comprises a pneumatic spring at least partially enclosing the twistlock in the circumferential direction around the twistlock.

Optionally, the predetermined threshold load is at least 500N, preferably at least 750N.

Optionally, the cargo member is a container.

A second aspect of the present invention relates to a cargo receiving arrangement adapted to receive a cargo member, the cargo receiving arrangement comprising one or more twistlock assemblies according to any one of the preceding claims.

Optionally, the cargo receiving arrangement is a vehicle trailer.

BRIEF DESCRIPTION OF THE DRAWINGS

With reference to the appended drawings, below follows a more detailed description of embodiments of the invention cited as examples.

In the drawings.

DETAILED DESCRIPTION OF PREFERRED EMBODIMENTS

Figure 1A:
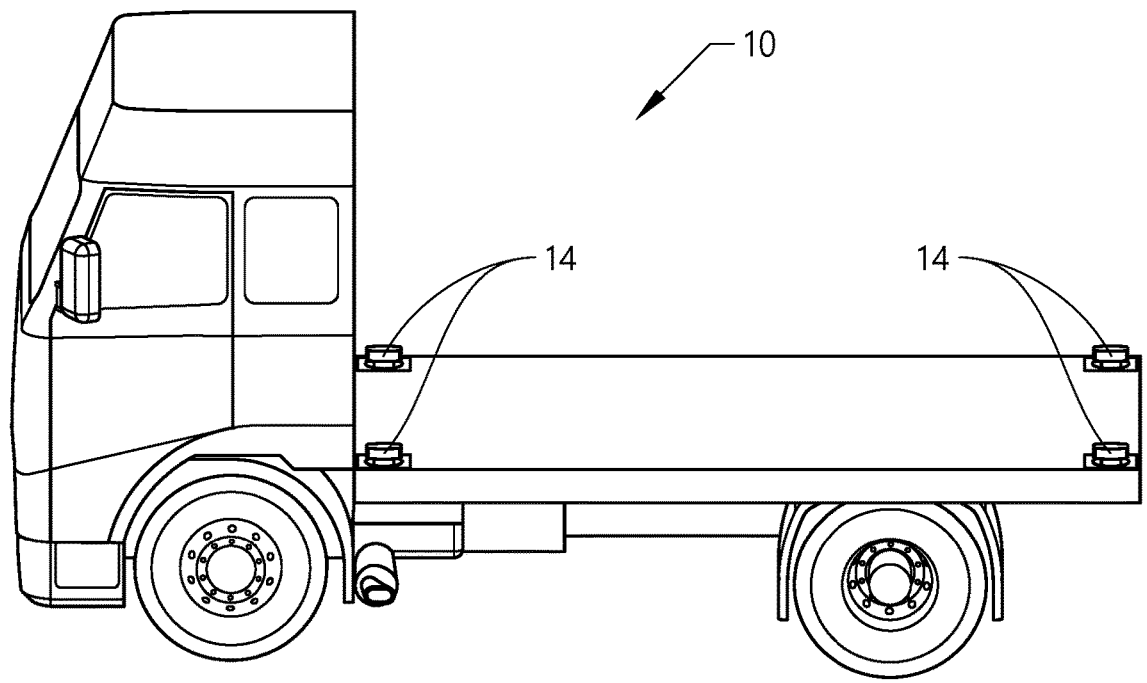
FIGS. 1a and 1b are a side view of a vehicle and a trailer, respectively.

FIG. 1a illustrates a truck 10 which should be seen as an example of a vehicle for which the twistlock assembly may be used. However, the twistlock assembly may be implemented in a plurality of different types of vehicles, such as a truck, a tractor, a car, a bus, a work machine such as a wheel loader or any other type of construction equipment.

Figure 1B:
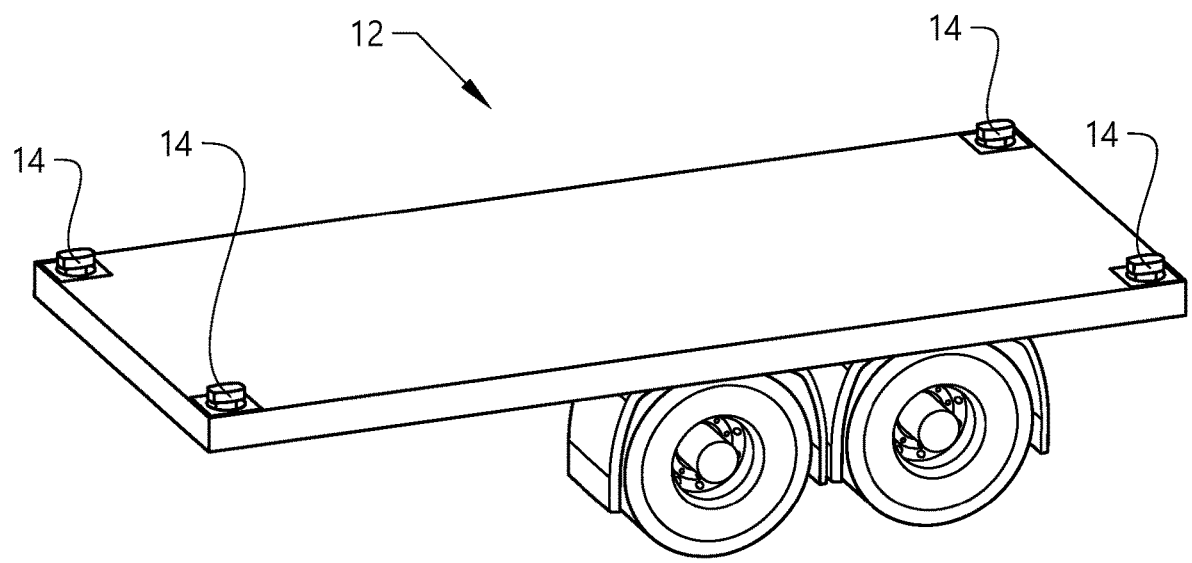

Furthermore, as indicated in FIG. 1b, the twistlock assembly according to the present invention may also be used for a trailer 12. In FIG. 1a and FIG. 1b, each one of the truck 10 and the trailer 12 comprises a plurality of twistlock assemblies 14.

Figure 2:
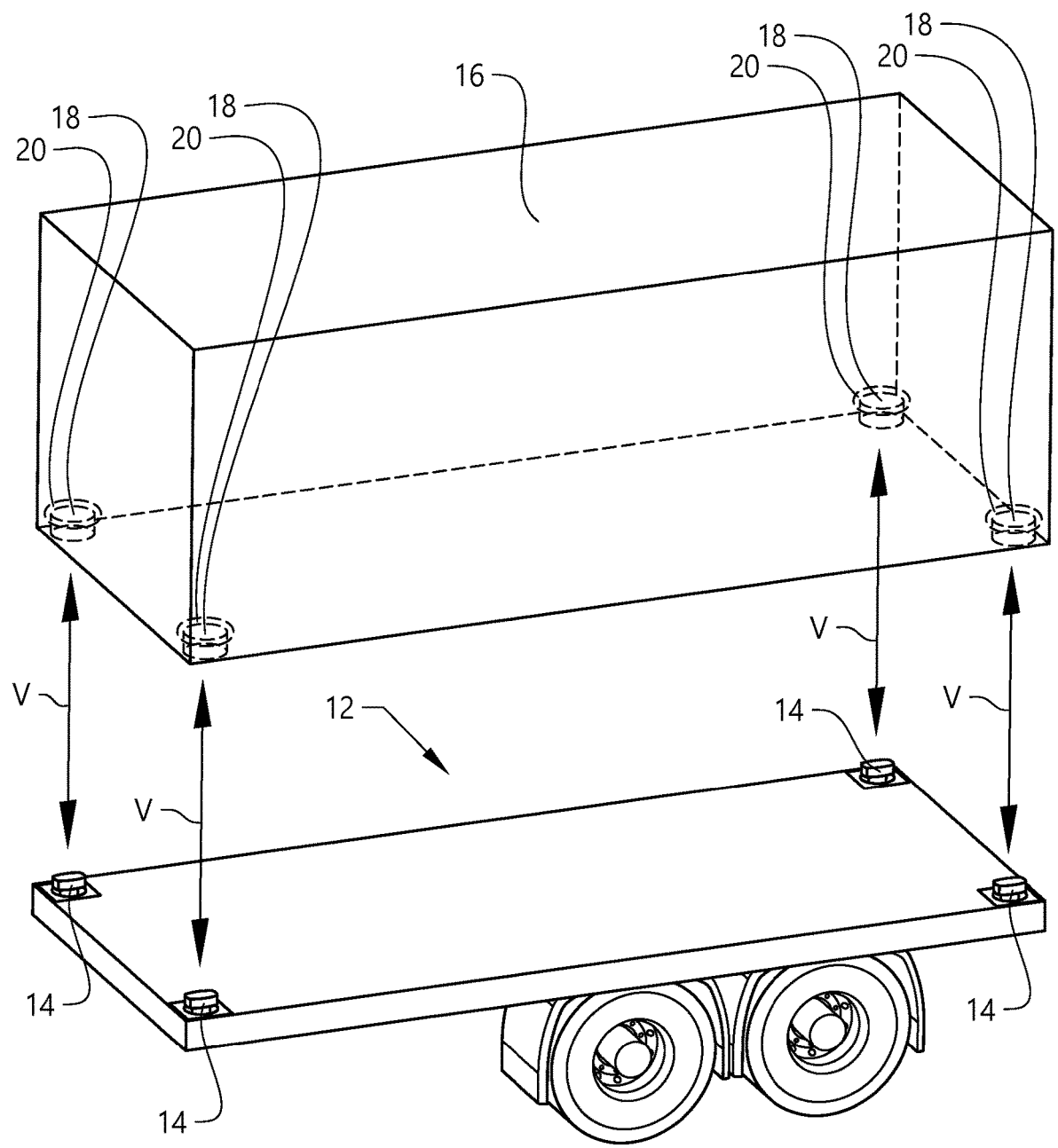
FIG. 2 is a side view of a trailer onto which a container is adapted to be loaded.

FIG. 2 illustrates a situation in which a cargo member 16, which in FIG. 2 is exemplified as a container, is loaded onto a cargo receiving arrangement 12, which in FIG. 2 is exemplified as a trailer. Further as indicated in FIG. 2, the cargo receiving arrangement 12 comprises one or more twistlock assemblies 14. In the FIG. 2 embodiment, the cargo receiving arrangement 12 includes four twistlock assemblies 14.

Moreover, as indicated in FIG. 2, the cargo member 16 comprises one or more openings 18, one for each twistlock assemblies 14 of the cargo receiving arrangement 12. The openings are sized and located such that that the twistlock of the corresponding twistlock assembly 14 is adapted to be at least partially inserted into the corresponding opening 18 of the cargo member 16.

Purely by way of example, each one of the openings 18 may be such that the twistlock of the corresponding twistlock assembly 14 can be at least partially inserted into the corresponding opening 18 of the cargo member 16 only when the twistlock assumes an unlocked condition as will be discussed hereinbelow. Purely by way of example, each one of the openings 18 may have a non-circular cross-section, such as an elliptical cross-section, in a plane perpendicular to the direction in which the cargo member 16 and the cargo receiving arrangement 12 are moved towards each other, which direction is exemplified as a vertical direction V in FIG. 2.

Purely by way of example, the cargo member 16 may be such that each one of the openings 18 is associated with a twistlock abutment surface 20. The twistlock abutment surface 20 may be adapted to receive a portion of the associated twistlock when the twistlock is been at least partially inserted into the opening and the twistlock has assumed its locked condition. When the twistlock of each twistlock assembly 14 has assumed its locked condition, the cargo member 16 is prevented from being disconnected from the cargo receiving arrangement 12.

As may be realized from the above, it is desired that each opening 18 is placed correctly in relation to its associated twistlock assembly 14 in order to ensure an appropriate connection between the cargo member 16 and the cargo receiving arrangement 12.

Figure 3:
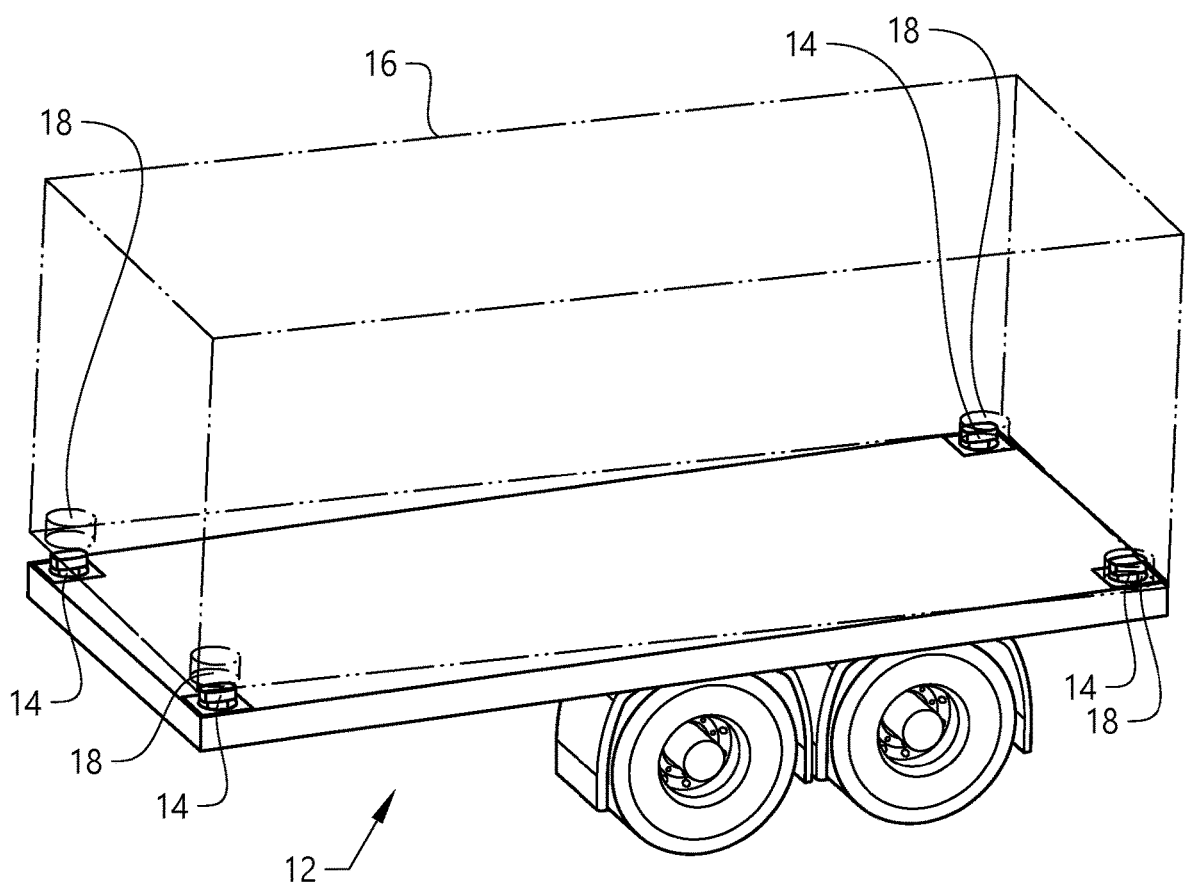
FIG. 3 is a side view of a trailer onto which a container is adapted to be loaded, wherein the container is in an undesired position relative to the trailer.

FIG. 3 illustrates a situation in which the cargo member 16, again exemplified as a container, is incorrectly placed relative to the cargo receiving arrangement 12 such that the openings 18 are not placed correctly relative to the twistlock assemblies 14. There is a risk that the twistlock of each one of the twistlock assemblies 14 in the FIG. 3 condition could nevertheless assume its locked condition and this would in turn result in that e.g. an operator or an inspector of an assembly comprising the cargo member 16 and cargo receiving arrangement 12 would draw the incorrect conclusion that the cargo member 16 is appropriately secured to the cargo receiving arrangement 12.

Figure 4:
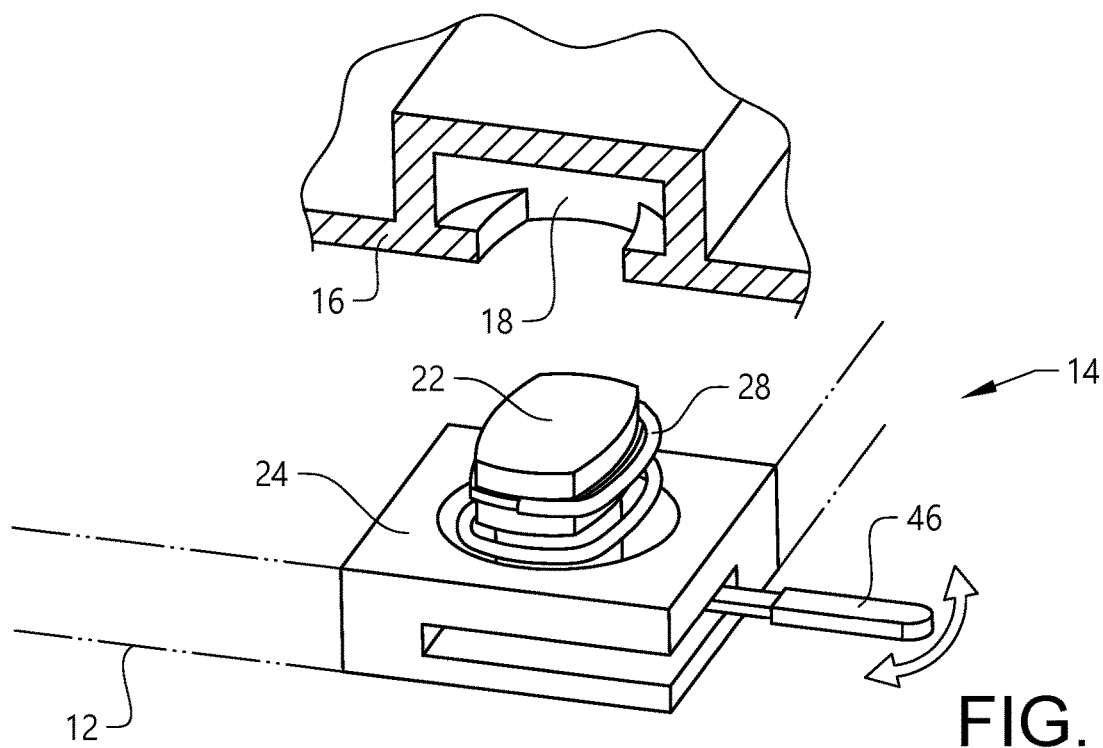
FIG. 4 is a perspective view of an embodiment of the twistlock assembly.

In order to address the above problem, and with reference to FIG. 4, the present invention proposes a twistlock assembly 14 for securing a cargo member 16 to a cargo receiving arrangement 12.

The twistlock assembly 14 comprises a twistlock 22 and a base member 24. Purely by way of example, the base member 24 may comprise or be constituted by a corner casting as illustrated in the FIG. 4 embodiment.

Figure 5A:
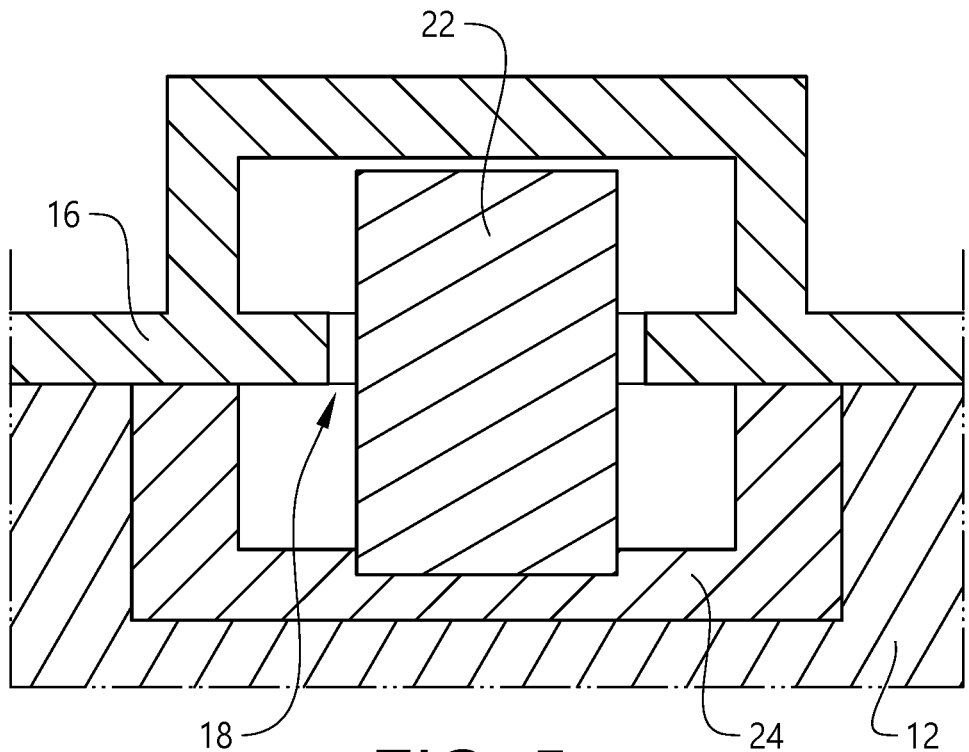
FIGS. 5a and 5b are schematic cross-sectional side views of an embodiment of a twistlock assembly.
Figure 5B:
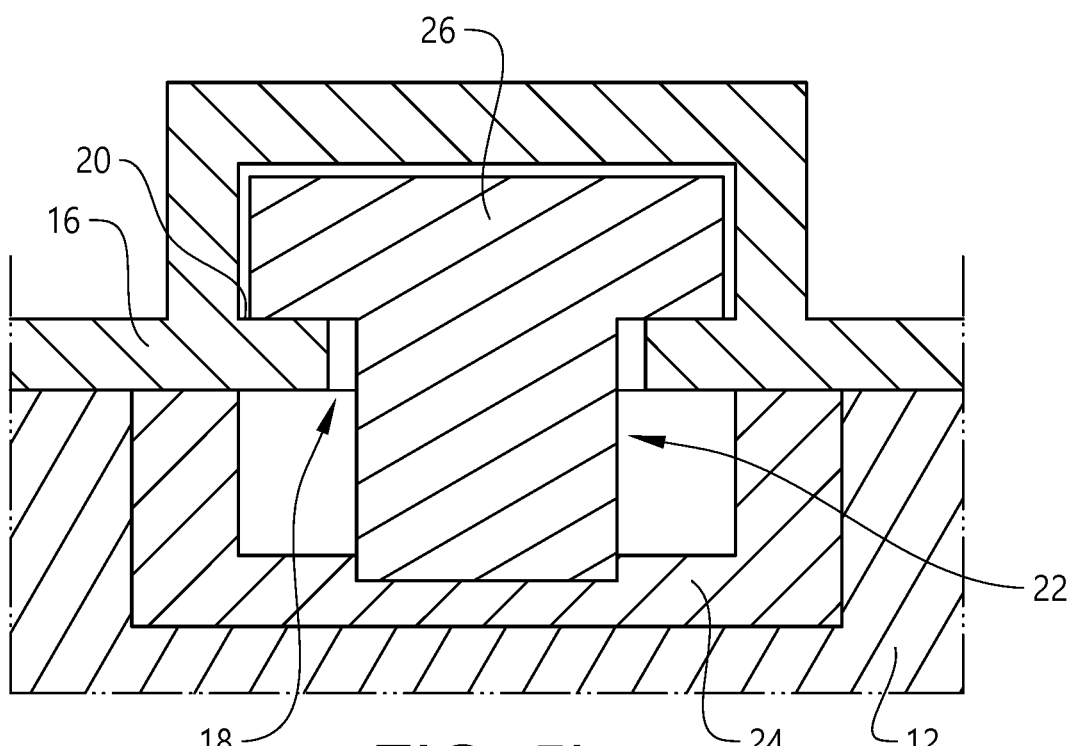

The twistlock 22 is adapted to be at least partially inserted into an opening 18 of a cargo member 16. With reference to FIG. 5a and FIG. 5b, the twistlock 22 is adapted to assume each one of an unlocked position (see FIG. 5a) and a locked position (see FIG. 5b), wherein the cargo member 16 is prevented from being disconnected from the base member 24 when the twistlock 22 assumes the locked position.

In the FIG. 5a and FIG. 5b embodiments, the twistlock 22 is adapted to be rotated relative to the base member 24 between the unlocked position (FIG. 5a) and the locked position (FIG. 5b). As such, in the locked position indicated in FIG. 5b, a twistlock portion 26 of the twistlock 22 is adapted to abut a twistlock abutment surface 20 of the cargo member 16. Thus, the twistlock may be rotatably connected to the base member 24.

However, it is also envisaged that in other embodiments, the twistlock assembly 14 can assume the unlocked and locked positions by way of other movements than a rotation of the twistlock 22 relative to the base member 24.

Figure 6A:
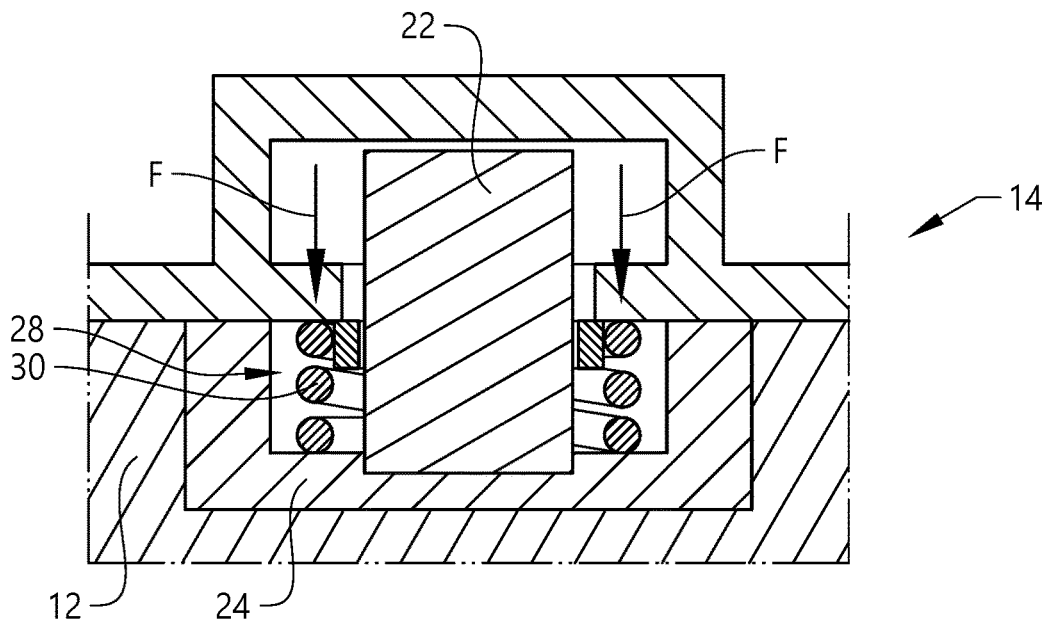
FIGS. 6a and 6b are schematic cross-sectional side views of another embodiment of a twistlock assembly.
Figure 6B:
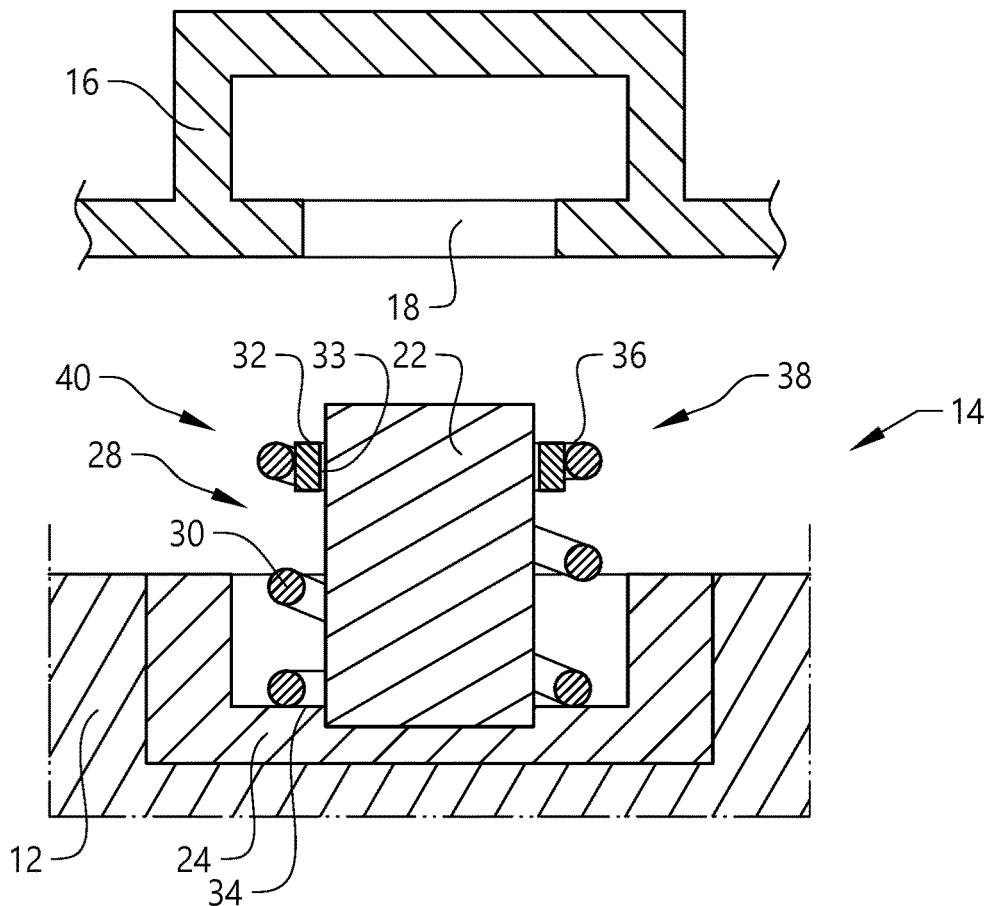

FIG. 6a and FIG. 6b illustrate a cross-sectional view of a twistlock assembly 14 according to the present invention. As may be gleaned from FIG. 6a and FIG. 6b, the twistlock assembly 14 further comprises a permittance assembly 28.

The permittance assembly 28 is such that it assumes a permittance condition (see FIG. 6a) when a load F applied by the cargo member 16 to the permittance assembly 28 is greater than or equal to a predetermined threshold load, such that the twistlock 22 can be moved from the unlocked position to the locked position as well as from the locked position to the unlocked position. In the FIG. 6a embodiment, the movement is achieved by means of a rotation.

Furthermore, the permittance assembly 28 is such that it assumes a prevention condition (see FIG. 6b) when the load applied by the cargo member 16 to the permittance assembly 28 is less than the predetermined threshold load, such that the twistlock 22 is prevented from being moved from the unlocked position to the locked position. In the FIG. 6b example, the cargo member 16 does not apply any load at all to the permittance assembly 28.

As such, as may be realized from the FIG. 6a and FIG. 6b example hereinabove, the permittance assembly 28 implies that the twistlock 22 can be moved from the unlocked position to the locked position only when the load F applied by the cargo member 16 to the permittance assembly 28 is greater than or equal to a predetermined threshold load.

As a non-limiting example, the above-mentioned predetermined threshold load may be at least 500N, preferably at least 750N.

This in turn implies that the twistlock 22 cannot be moved from the unlocked position to the locked position unless the cargo member 16, and in particular the opening 18 thereof, is appropriately located in relation to the twistlock assembly 14.

As indicated in e.g. FIG. 6b, the permittance assembly 28 comprises a stop member 32, adapted to abut at least a portion of the twistlock 22 to thereby prevent the twistlock 22 from assuming the locked position, when the permittance assembly 28 assumes the prevention condition. As such, the stop member 32 is adapted to abut at least a portion of the twistlock 22 when the twistlock is attempted to be moved to the locked position.

Purely by way of example, the stop member 32 may comprise a stop surface 33 adapted to abut a portion of the twistlock 22 to thereby prevent movement, such as a rotation relative to the base member 24, of the twistlock 22. As such, the stop surface 33 is adapted to abut at least a portion of the twistlock 22 when the twistlock is attempted to be moved to the locked position.

Furthermore, as also indicated in FIG. 6b, the permittance assembly 28 may comprise a resilient assembly 30 adapted to receive at least a portion of the load F applied by the cargo member 16. Purely by way of example, the stiffness of the resilient assembly 30 may be selected for controlling or setting the predetermined threshold load as discussed hereinabove.

In the FIG. 6b embodiment, the resilient assembly 30 is exemplified as an elastic spring, illustrated as a helical spring. However, as other non-limiting examples, the resilient assembly 30 may comprise at least one of the following instead of or in addition to an elastic spring: a hydraulic spring, an electrically biased spring and a pneumatic spring.

It should be noted that the resilient assembly 30 and the stop member 32 need not necessarily be separate components. As such, in implementations of the permittance assembly 28, the resilient assembly 30 and the stop member 32 may form a unitary component. As such, with reference to FIG. 6b, an uppermost portion of the elastic spring, exemplified as a helical spring in FIG. 6b, may constitute the stop member 32.

Furthermore, as indicated in FIG. 6b, an attachment portion 34 of the resilient assembly 30 may be fixedly attached to the base member 24 and a load receiving portion 36 of the resilient assembly 30 may be adapted to receive the at least a portion of the load applied by the cargo member 16.

Furthermore, again with reference to FIG. 6b, the load receiving portion 36 may comprise a first load receiving portion 38 and a second load receiving portion 40 which may be located on opposite sides of the twistlock 22. In the FIG. 6b example, the first load receiving portion 38 and the second load receiving portion 40 of the load receiving portion are portions of the helical spring constituting the FIG. 6b resilient assembly 30. As such, the first load receiving portion 38 and a second load receiving portion 40 may constitute portions of a single member forming part of, or constituting, the resilient assembly 30.

Purely by way of example, and as illustrated in FIG. 6b, each one of the first load receiving portion 38 and the second load receiving portion 40 is adapted to abut a portion of, i.e. to be in contact with, the cargo member 16.

Moreover, as indicated in FIG. 6b, the resilient assembly 30 may at least partially enclose the twistlock 22 in a circumferential direction around the twistlock 22. As such, using the FIG. 6b helical spring as an exemplary implementation of the resilient assembly 30, the helical spring 30 may at least partially enclose the twistlock 22 in the circumferential direction around the twistlock 22.

As a non-limiting example, the first load receiving portion 38 and the second load receiving portion 40 may be located on opposite sides of the twistlock 22 such that a fictious connection line (not shown) connecting the first and second load receiving portions 38, 40 will extend through at least a portion of the twistlock 22. Purely by way of example, in embodiments of the twistlock assembly 14 in which the twistlock 22 is rotatably connected to the base member 24, the fictious connection line may extend in a plane perpendicular to an axis of rotation of the twistlock 22.

Figure 7:
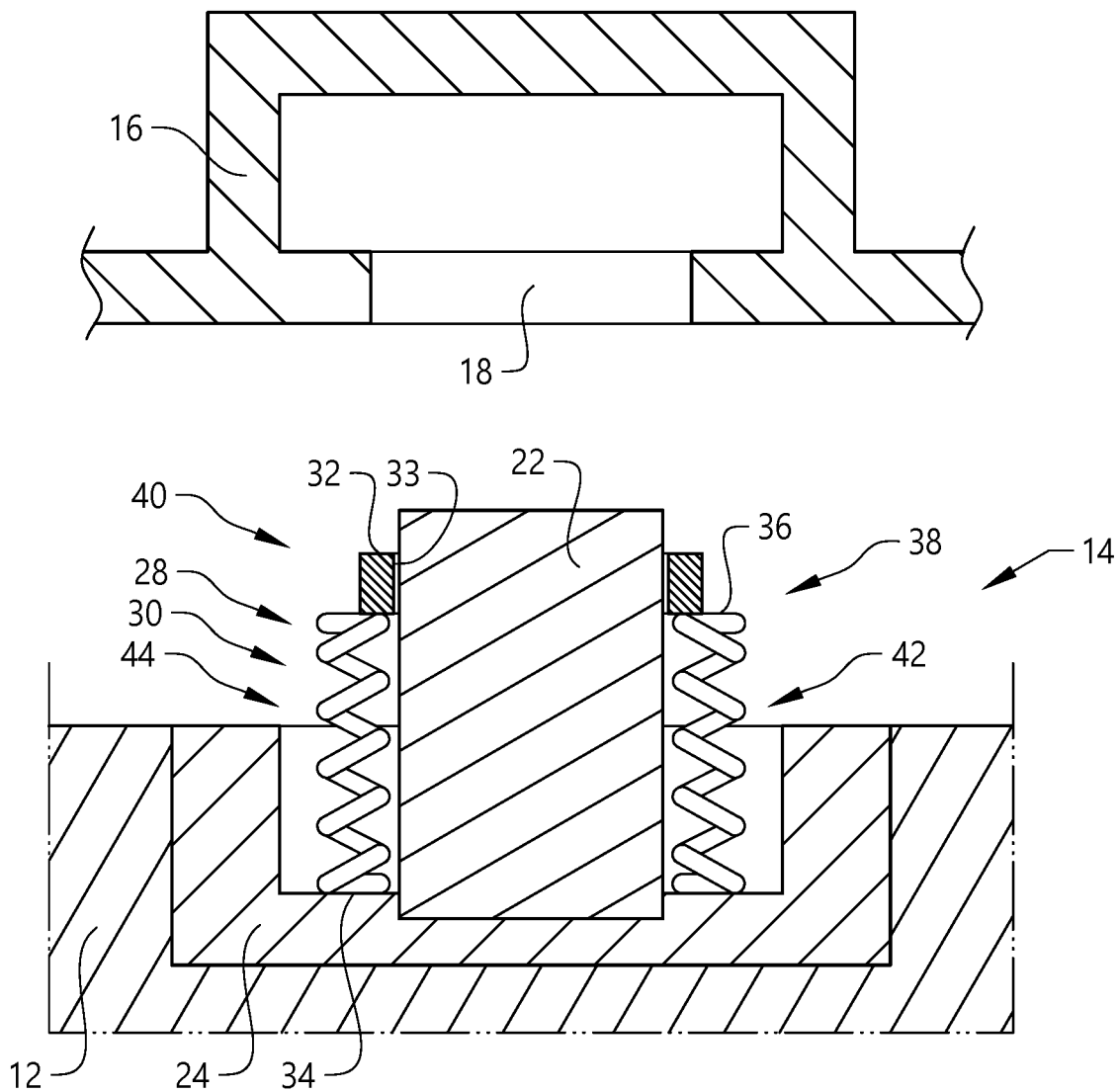
FIG. 7 is a schematic cross-sectional side view of a further embodiment of a twistlock assembly.

However, it is also envisaged that the first load receiving portion 38 and the second load receiving portion 40 of the load receiving portion 36 may be associated with separate components at least forming part of the resilient assembly 30. To this end, reference is made to FIG. 7 illustrating an embodiment in which the first load receiving portion 38 is connected to a first resilient member 42 and the second load receiving portion 40 is connected to a second resilient member 44. The first and second resilient members 42, 44 are comprised in the resilient assembly 30. Moreover, though purely by way of example, the first and second resilient members 42, 44 may be located on opposite sides of the twistlock 22.

Turning back to FIG. 4, the twistlock assembly 14 may further comprise an actuator 46 being connected to the twistlock 22. The actuator 46 is adapted to assume an unlocked condition (as illustrated in FIG. 4) resulting in that the twistlock 22 assumes the unlocked position. The actuator 46 is also adapted to assume a locked condition resulting in that the twistlock 22 assumes the locked position.

Purely by way of example, and as illustrated in FIG. 4, the actuator 46 may be adapted to be actuated manually. Furthermore, as a non-limiting example, the actuator may comprise a lever, as exemplified in FIG. 4. As may be realized from FIG. 4, the condition, e.g. the position, of the actuator 46 may present a visual indication whether the twistlock 22 assumes the unlocked position or the locked position.

It is also envisaged that embodiments of the twistlock assembly 14 may comprise another type of actuator, such as an electrically, pneumatically or hydraulically controlled actuator. Purely by way of example, the actuator may comprise an electric, pneumatic or hydraulic motor (not shown). Furthermore, it is also contemplated that the actuator 46 may be biased towards its locked condition, for instance using a resilient member such as a spring or the like. As such, the actuator 46 may be such that the actuator 46 is automatically moved to its locked condition when the permittance assembly 28 assumes the permittance condition. As such, using FIG. 6a and FIG. 6b as an example, in the FIG. 6b condition when the permittance assembly 28 assumes the prevention condition, the actuator 46 (not shown in FIG. 6a and FIG. 6b) may assume its unlocked condition. Then, when the permittance assembly 28 assumes the permittance condition, see FIG. 6a, the actuator 46 may be moved automatically to its locked condition by means of a biasing force imparted on the actuator 46.

Furthermore, as indicated by the arrow in FIG. 4, the actuator 46 can assume each one of the locked condition and the unlocked condition when the permittance assembly 28 assumes the previously discussed permittance condition.

Although the embodiments presented hereinabove comprise a resilient assembly 30 which in turn comprises one or more elastic springs, implemented as helical springs in the above embodiments, it is also envisaged that the resilient assembly 30 may comprise or be constituted by other types of resilient means, such as a hydraulic spring, an electrically biased spring or a pneumatic spring. To this end, reference is made to FIG. 8, illustrating an embodiment of a twistlock assembly in which the resilient assembly 30 comprises a pneumatic spring which in turn comprises an air bellow 48.

Figure 8:
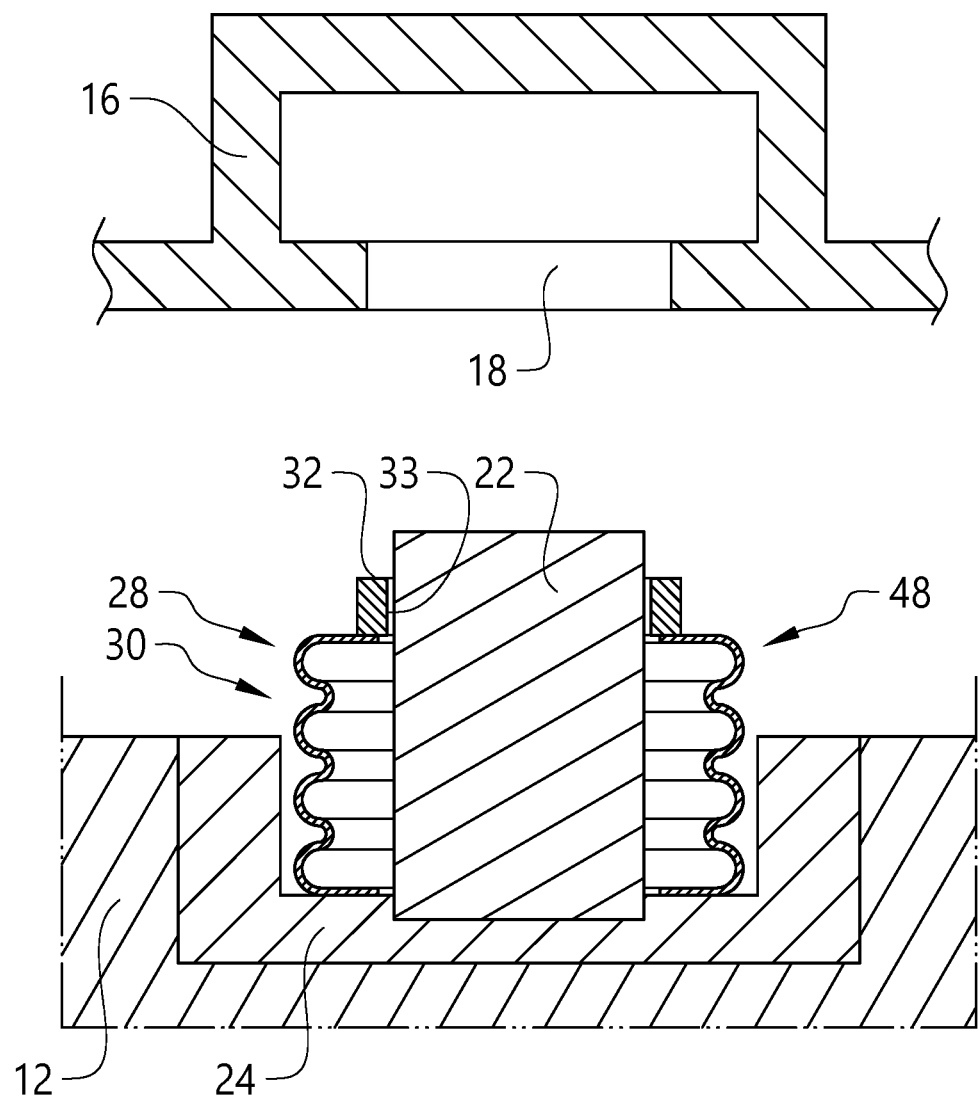
FIG. 8 is a schematic cross-sectional side view of yet another embodiment of a twistlock assembly.

In a similar vein as for the FIG. 6b embodiment, the FIG. 8 pneumatic spring may at least partially enclose the twistlock 22 in a circumferential direction around the twistlock 22.

It is to be understood that the present invention is not limited to the embodiments described above and illustrated in the drawings; rather, the skilled person will recognize that many changes and modifications may be made within the scope of the appended claims.

The invention claimed is:

1. A twistlock assembly for securing a cargo member to a cargo receiving arrangement, the twistlock assembly comprising:
   a base member;
   a twistlock adapted to be at least partially inserted into an opening of a cargo member, the twistlock adapted to assume an unlocked position and a locked position, wherein in the locked position the cargo member is prevented from being disconnected from the base member; and
   a permittance assembly comprising a first spring portion and a second spring portion on an opposite side of the twistlock as the first spring portion, the first and the second spring portions adapted to receive and be compressed by at least a portion of a load applied by the cargo member;
   wherein the permittance assembly is configured to:
      allow rotational movement of the twistlock between the unlocked position and the locked position while the load applied by the cargo member to the permittance assembly is greater than or equal to a predetermined threshold load, and
      prevent rotational movement of the twistlock from the unlocked position to the locked position while the load applied by the cargo member to the permittance assembly is less than the predetermined threshold load.

2. The twistlock assembly of claim 1, wherein the twistlock assembly further comprises an actuator being connected to the twistlock, the actuator being adapted to assume an unlocked condition resulting in that the twistlock assumes the unlocked position, the actuator also being adapted to assume a locked condition resulting in that the twistlock assumes the locked position.

3. The twistlock assembly of claim 2, wherein the actuator can assume each one of the locked condition and the unlocked condition when the load applied by the cargo member to the permittance assembly is greater than or equal to the predetermined threshold load.

4. The twistlock assembly of claim 2, wherein the actuator is adapted to be actuated manually.

5. The twistlock assembly of claim 2, wherein the actuator comprises a lever.

6. The twistlock assembly of claim 1, wherein the permittance assembly comprises a stop member adapted to abut at least a portion of the twistlock to thereby prevent the twistlock from assuming the locked position when the load applied by the cargo member to the permittance assembly is less than the predetermined threshold load.

7. The twistlock assembly of claim 1, wherein each one of the first spring portion and the second spring portion is adapted to abut a portion of the cargo member.

8. The twistlock assembly of claim 1, wherein the first spring portion and the second spring portion constitute portions of a single member.

9. The twistlock assembly of claim 1, wherein at least one of the first spring portion and the second spring portion comprises at least one of an elastic spring, a hydraulic spring, an electrically biased spring, and a pneumatic spring.

10. The twistlock assembly of claim 9, wherein at least one of the first spring portion and the second spring portion at least partially encloses the twistlock in a circumferential direction around the twistlock.

11. The twistlock assembly of claim 10, wherein at least one of the first spring portion and the second spring portion comprises a helical spring at least partially enclosing the twistlock in the circumferential direction around the twistlock.

12. The twistlock assembly of claim 10, wherein at least one of the first spring portion and the second spring portion comprises the pneumatic spring at least partially enclosing the twistlock in the circumferential direction around the twistlock.

13. The twistlock assembly of claim 1, wherein the predetermined threshold load is at least 500N, preferably at least 750N.

14. The twistlock assembly of claim 1, wherein the cargo member is a container.

15. A cargo receiving arrangement adapted to receive a cargo member, the cargo receiving arrangement comprising one or more of the twistlock assemblies of claim 1.

16. The cargo receiving arrangement of claim 15, wherein the cargo receiving arrangement is a vehicle trailer.

17. The twistlock assembly of claim 1, wherein the permittance assembly comprises a stop member adapted to abut at least a portion of the twistlock adapted to be inserted into the opening of the cargo member to thereby prevent the twistlock from assuming the locked position when the load applied by the cargo member to the permittance assembly is less than the predetermined threshold load.

* * * * *